United States Patent [19]

Nagel et al.

[11] Patent Number: 4,694,135

[45] Date of Patent: Sep. 15, 1987

[54] METHOD AND APPARATUS FOR MONITORING AND CONTROLLING RESISTANCE SPOT WELDING

[75] Inventors: Gregory L. Nagel; David M. Sidlosky, both of Royal Oak; Balarama V. Murty, Sterling Heights; Anthony Lee, West Bloomfield, all of Mich.; Dixon Cleveland, Vienna, Va.

[73] Assignee: General Motors Corporation, Detroit, Mich.

[21] Appl. No.: 883,934

[22] Filed: Jul. 9, 1986

[51] Int. Cl.[4] .............................................. B23K 11/24
[52] U.S. Cl. .................................... 219/110; 219/109; 219/117.1
[58] Field of Search ............. 219/108, 109, 110, 117.1

[56] References Cited

U.S. PATENT DOCUMENTS

| | | | |
|---|---|---|---|
| 3,546,421 | 12/1970 | Meyer et al. | 219/110 |
| 4,079,226 | 3/1978 | Boyd et al. | 219/110 |
| 4,302,653 | 11/1981 | Denning et al. | 219/110 |
| 4,419,560 | 12/1983 | Zurek | 219/110 |
| 4,447,698 | 5/1984 | Van Sikle et al. | 219/110 |
| 4,456,810 | 6/1984 | Schumacher et al. | 219/110 |
| 4,477,709 | 10/1984 | Cleveland et al. | 219/110 |
| 4,493,965 | 1/1985 | Houchens et al. | 219/110 |
| 4,503,311 | 3/1985 | Houchens et al. | 219/110 |
| 4,503,312 | 3/1985 | Nakata et al. | 219/110 |

FOREIGN PATENT DOCUMENTS 2490129 2/1984 France .
1446652 8/1976 United Kingdom .

OTHER PUBLICATIONS

"Superior Quality Production Spot Welding Using Adaptive Control", cited by applicant, undated.
Schumacher et al., "Resistance Spot Welding Control that Automatically Selects the Welding Schedule for Different Types of Steel", SAE paper No. 850407.
Proceedings of SMW Conference 10/3–11/1/1984, The American Welding Society.
Johnson et al., "The Institute's Automatic Voltage Spot Weld Correction System", The Welding Institute Research Bulletin, vol. 15, 8/1974.

*Primary Examiner*—Clifford C. Shaw
*Attorney, Agent, or Firm*—Warren D. Hill

[57] ABSTRACT

A method and apparatus are disclosed for analyzing the dynamic resistance of a resistance spot welding process to determine the time of an expulsion event and use that time as the weld completion time for controlling weld termination via a weld feedback signal, controlling automatic current stepping, and identifying maintenance needs. A preconditioning pulse is used to stabilize the weld process and aid in obtaining interpretable resistance information. After an initial blanking period the resistance curve is analyzed by calculating first and second derivative values and applying several algorithms that make possible the computer recognition of characteristic resistance curve shapes resulting from weld expulsion under good geometry, bad geometry and edge weld conditions.

18 Claims, 11 Drawing Figures

Microfiche Appendix Included
(1 Microfiche, 59 Pages)

METHOD AND APPARATUS FOR MONITORING AND CONTROLLING RESISTANCE SPOT WELDING

MICROFICHE APPENDIX

A microfiche appendix of a computer program listing comprising one microfiche containing 60 frames is deposited as a part of this specification.

FIELD OF THE INVENTION

This invention relates to resistance spot weld monitoring and control and particularly to a method and apparatus therefor based on the detection of metal expulsion by analysis of the dynamic weld resistance.

BACKGROUND OF THE INVENTION

In the resistance welding art it has long been recognized that it is desirable to monitor the condition of a weld during the weld process to evaluate the progress of weld formation and to use information about the satisfactory nugget formation to control the termination of weld current and to use information about weld quality or process variables to provide quality control statistics as well as indications of appropriate maintenance actions.

Many approaches to weld monitoring and control have been explored and success has been noted only in laboratory tests or in very carefully controlled production environments. Ordinary factory conditions introduce many variables which mitigate against successful detection of weld characteristics and adaptive control of the process. The following list suggests many of those variables:
1. Coating material
2. Coating thickness variations
3. Air pressure variations
   this can cause very rapid cap wear due to arcing
   this can also change the nugget formation time by a factor of two
4. Air cylinder wear
   this can cause very rapid cap wear due to arcing
5. Rising tip force during a weld
   this can cause uncontrolled nugget formation
6. Gun stiffness variations
   stiff guns do not allow electrode position to change during a weld. If the caps do move more energy may be required to form a weld at the new site.
7. Near-by metal (eddy current loss)
   this can reduce the power supplied to the weld
8. Shunt paths (through adjacent welds)
   this can reduce the power supplied to the weld
9. Grounding (shunt paths through fixturing)
   this can reduce the power supplied to the weld
10. Water flow variations
    this can result in early electrode cap failure
    this can cause a wide variation in the amount of power that is required to form a weld
11. Weld material
12. Number of stack-ups
13. Sheet thickness
14. Cap geometry and material
    cap geometry changes as more welds are made
    one cap style may not be used consistently
15. Cable degradation (increased cable resistance)
    this is difficult maintenance factor to predict
16. Weld through sealer
17. Poor access
    causes off angle welding which requires more power
18. Weld location near an edge
19. Poor fit-up
20. Cocked electrodes
    causes electrical skidding during weld and affects the amount of energy required to make a weld
21. Line voltage fluctuations
22. Changing height and number of stack-ups in a single weld pattern made by one gun
23. Weld schedule and squeeze time
24. Hold time, repeat time
    fast repeat times cause gun heating which reduces the power supplied to welds
25. Surface contaminants
    contaminants such as paint, grease ... can cause large changes in the time to make a weld
26. Skid
    this can come from many sources but the result is that more power is required to make a weld
27. Part stiffness
    is a factor in the time required to align the caps to the sheet metal
28. Electrode alignment
    this can cause small or non-existent nuggets to be formed
    this can be caused by using improper shanks or flimsy guns
29. Mechanical vibration during a weld
    causes erratic feedback control signals
30. Electrode wear
    can cause poor nugget formation if it is not compensated for
    present day cap wear compensation is not feedback controlled so unexpected plant variations require manual adjustment
31. Mechanical loading of the gun (typical in robot applications)
    this happens when an automatic weld gun is not aligned with the sheet metal. This causes a variance in the time for nugget formation because heat generation is a function of contact resistance which changes with the mechanical loading of the gun as well as many other variables.

For a weld monitor or control to be useful in most factory settings it should generally overcome these variables to help produce good welds or at least to recognize and report the kind of problems which require correction. It is recognized that extreme cases of some conditions will frustrate any attempt at real time recognition or resolution. Still, it is desired to overcome the weld condition variables in the majority of welds to monitor or control the weld process. It has been recognized that the weld expulsion event could be a good indicator of weld completion but heretofore an algorithm for recognizing the expulsion and its characteristics has not been available and in most spot weld applications the weld process has not been sufficiently stable to reliably analyze the weld parameters.

SUMMARY OF THE INVENTION

It is therefore an object of the invention to provide a method and apparatus for detecting weld expulsion as an indicator of weld progress in stabilized resistance spot welding.

It is another object to provide such a method and apparatus for controlling welding and for determining maintenance needs.

It is a further object to provide such a method and apparatus for controlling weld current stepping.

The invention is carried out by a method of monitoring resistance spot welding comprising the steps of; measuring electrical welding parameters, calculating dynamic resistance values and time derivative resistance values from the measured parameters, and analyzing the calculated values during the welding process to detect an expulsion event and the time of the event.

The invention is also carried out by a method of controlling resistance spot welding comprising the steps of; applying welding current to a workpiece, measuring electrical welding parameters, calculating dynamic resistance values and derivative resistance values from the measured parameters, analyzing the calculated values during the welding process to detect an expulsion event and the time of the event, and terminating the welding current upon detection of expulsion.

The invention is further carried out by a controller for a resistance spot welding system having electrode means for applying weld current and pressure to a workpiece including; means for supplying weld current according to a weld schedule, and control means coupled to the current supply means programmed to: (a) measure electrical welding parameters, (b) calculate dynamic resistance values and derivative resistance values from the measured parameters, (c) analyze the calculated values during the welding process to detect an expulsion event and the time of the event, and (d) signal the current supply means to terminate the welding current upon detection of expulsion.

The invention is still further carried out by a method of controlling resistance spot welding comprising the steps of; applying welding current to a workpiece, measuring electrical welding parameters, calculating dynamic resistance values and derivative resistance values from the measured parameters, analyzing the calculated values during the welding process to detect an expulsion event and the expulsion time, averaging the expulsion time over a plurality of consecutive welds to obtain a trend of expulsion time, and changing the heat setting when the average time varies from a setpoint, thereby compensating for changes in electrode geometry.

BRIEF DESCRIPTION OF THE DRAWINGS

The above and other advantages of the invention will become more apparent from the following description taken in conjunction with the accompanying drawings wherein like reference numerals refer to like parts and wherein.

DESCRIPTION OF THE PREFERRED EMBODIMENT

The following description refers to a workpiece which is two or more metal sheets stacked for bonding by resistance spot welding. Although not limited to particular materials the disclosed procedures and equipment have been found to be especially successful when used with stackups of all bare steel sheets or with all galvanized steel sheets.

The resistance spot weld process applies electrode force to the workpiece and passes current through a local area of a workpiece to heat the metal, especially in the interface region, to produce a molten nugget. If the weld current is terminated when the nugget reaches a desired size and the electrode force is maintained until the nugget congeals, an optimum strength weld is produced. If the weld current is not terminated at that time, expulsion of some of the molten metal from the nugget region will occur. By detecting expulsion and then terminating weld current, a good weld can still be made if the the electrode force is maintained until the remaining nugget material congeals. If the workpiece material has melted to the point that there is enough free liquid steel to be expelled under the pressure of the electrodes, then the molten material from the two workpiece surfaces will have thoroughly mixed, and the penetration of the nugget into each of the sheets will be sufficient to guarantee a good weld.

Much research on monitoring weld resistance has shown that the expulsion event has a strong impact on the R-curve. As the molten nugget grows the resistance gradually decreases due to gradual electrode indentation into the workpiece but when expulsion occurs the molten metal is suddenly displaced (generally within a fraction of a half cycle), the electrodes rapidly indent the workpiece and resistance rapidly drops. The shape of the R-curve readily reveals the expulsion event to the human eye. This invention includes an automated algorithm for analyzing the dynamic resistance to permit machine recognition of the expulsion. As a result the time of expulsion for each weld can be determined, a weld control feedback responsive to expulsion can terminate weld current, and weld statistics can be generated for quality control purposes. The analysis of the expulsion times of a set of sequential welds yields trends that permit automatic current stepping to compensate for changing electrode conditions. In addition, the algorithm yields information on edge welds and poor fit-up which is useful in determining needs for maintenance.

Figure 1:
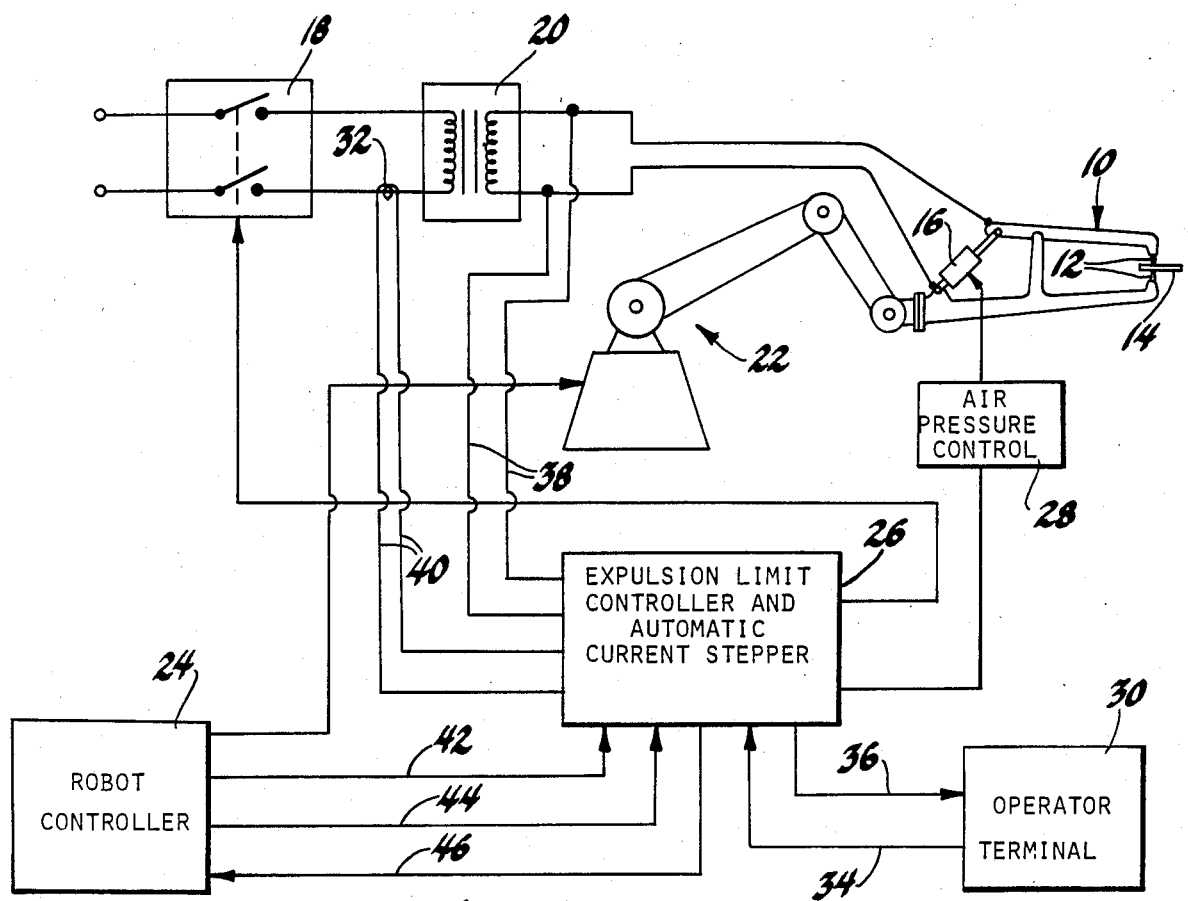
FIG. 1 is a schematic diagram of weld monitor and control apparatus according to the invention.

FIG. 1 illustrates welding apparatus equipped for monitoring and controlling welds. A weld gun 10 has a pair of electrodes 12 clamped against a workpiece 14 by an air cylinder 16. A power supply 18 regulates the weld current or heat which is supplied to the weld gun 10 through a transformer 20. A robot 22 controlled by a robot controller 24 positions the electrodes at preprogrammed workpiece locations. A weld controller 26 incorporating expulsion limit control and automatic current stepper control provides control signals to an air pressure control 28 and to the power supply 18. An operator terminal 30 can input heat schedules on line 34 to the controller 26 and receive weld results from the controller on line 36. Other inputs to the controller 26 are the secondary voltage on lines 38 and the primary current on lines 40 derived from a current transducer 32. The robot controller 24 sends weld position numbers on line 42 to the controller 26 to allow the controller 26 to select the appropriate weld schedule, as well as a weld enable signal on line 44 when the weld gun is ready. The controller 26 provides an end-of-weld signal on line 46 to the robot controller 24 when the weld current and the hold period have terminated. The controller 26 comprises a standard commercial weld current controller such as "The Legend" TM Medar controller model no. 701204 coupled with a microprocessor based controller such as an IBM TM PC computer programmed as described below.

Figure 2:
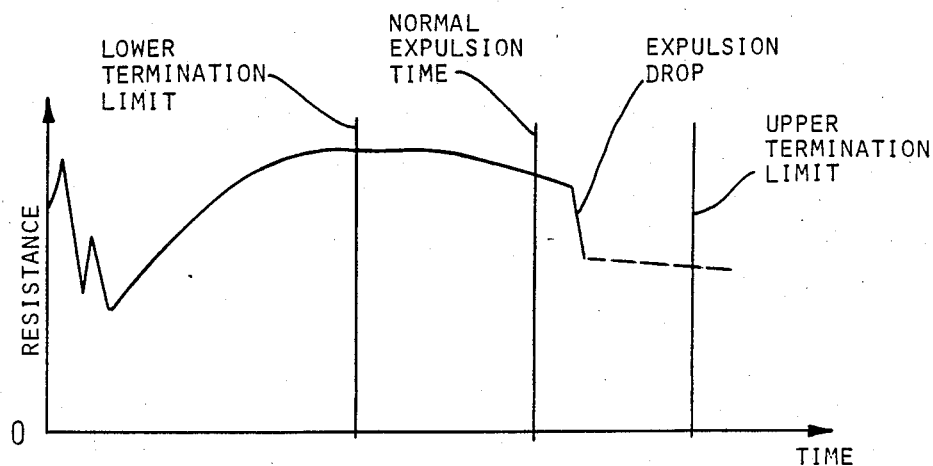
FIG. 2 is a weld resistance curve illustrating an expulsion characteristic and termination limits.

A typical R-curve is shown in FIG. 2. When the electrodes 12 first contact the workpiece 14 the electrode force gradually builds up and the weld resistance declines because the parts are forced together to decrease the interface resistance. As indicated on the R-curve, there can be erratic signals generated in the first few cycles. The many weld condition variables listed above may contribute unpredictable operation in this region. It is the preferred practice in most cases to precondition the workpiece to stabilize the weld process. This is accomplished by applying a low voltage to the electrodes prior to contact and monitoring the voltage or current by the controller 26 to sense the time of contact when good conductivity has been established. Then, about one cycle after contact, a short pulse of current is applied followed by a cooling period prior to the regular weld current schedule. The current pulse is of the same order of magnitude as the weld current and must be applied when the electrode force is between about 10% and 75% of its steady state value. At that time the interface resistances are neither too high nor too low to rapidly heat, soften and/or melt workpiece surfaces enough to make good electrical contact and stabilize the weld process.

After the initial few cycles of the weld the workpiece experiences bulk heating and expansion which are accompanied by a general rise in resistance. Then nugget melting starts and the resistance decreases gradually. When expulsion occurs the resistance rapidly decreases and the weld current should be terminated, although the electrode force is continued until the nugget solidifies. For a given stackup of a given type of material a weld schedule is established which produces expulsion in most cases near a nominal expulsion time. A lower termination limit, set at 30% to 40% below the nominal expulsion time, insures that at least a minimum energy has been imparted to the weld. An upper termination limit, set at about 30% to 40% above the nominal expulsion time, forces weld termination in those cases which do not exhibit expulsion. According to prior practice, controllers without feedback control are set at fixed termination times high enough to assure welds in a large number of cases but low enough to prevent excessive overwelding. By using the feedback control described herein the termination time within the limits is variable to suit the condition of each weld and the average weld time is less than in the fixed time case.

Figure 3:
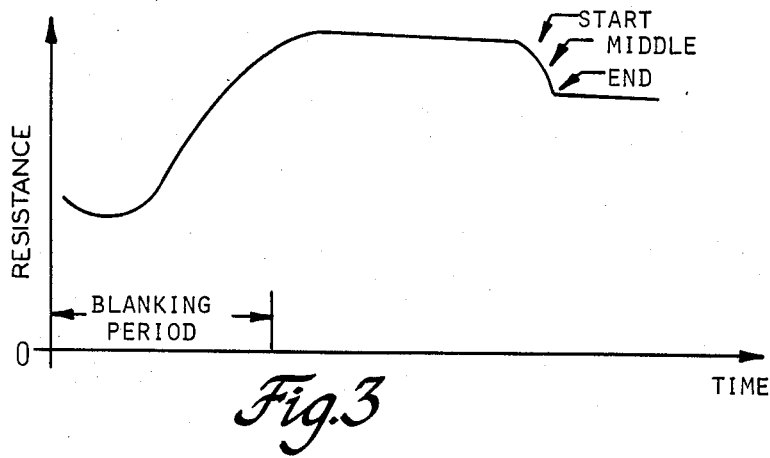
FIG. 3 is a weld resistance curve illustrating a blanking period and expulsion details.

FIG. 3 is another resistance curve showing an idealized expulsion signature and a blanking period. The initial weld cycles are blanked out to avoid any confusing signals which may occur in the early part of a weld. The blanking period starts at the beginning of the weld process and extends a set number of cycles not greater than the lower termination limit or may be set to continue until some event such as the beginning of weld nugget formation is detected. The typical expulsion shape includes a start, denoted by a sharp negative drop of resistance, a middle, denoted by a continued drop of resistance, and an end, denoted by a sudden leveling. Each of these features or indicators are detected by an algorithm analyzing $dR/dt$ and $d^2R/dt^2$ at each half cycle and the appropriate START, MIDDLE or END flag is set when a feature is detected. If all three features are present an expulsion is declared. If the start is too indistinct to be detected an expulsion will be declared if the middle and a sharp end are detected. Similarly, if the end is indistinct an expulsion is declared if a strong start and a middle are detected. In addition the shape of the tail is analyzed to reveal edge welds and bad geometry conditions.

Figure 4:
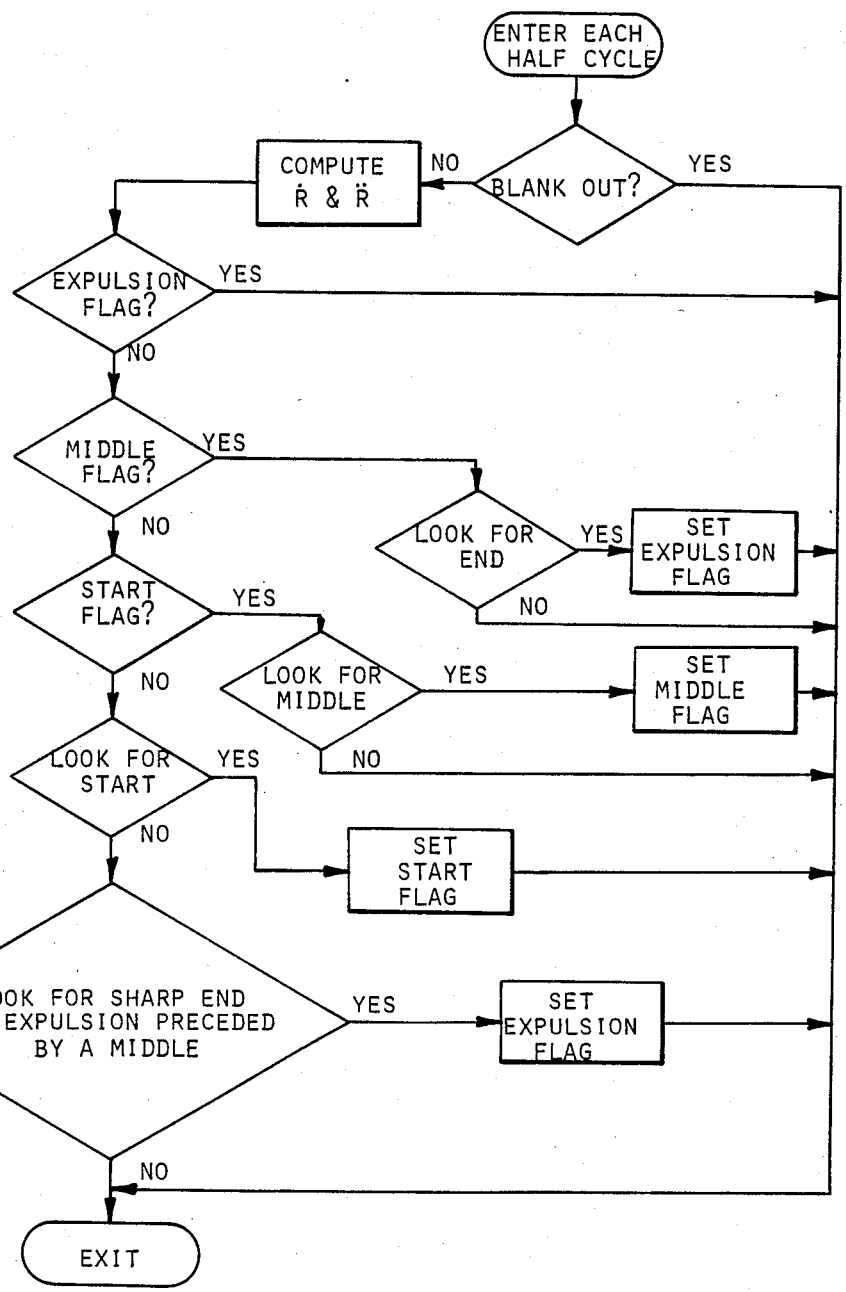
FIG. 4 is a flow chart illustrating the overall program according to the invention.

FIG. 4 shows the algorithm in simplified form and details are set out in FIGS. 6-9. The algorithm for detecting expulsion and indicating particular welding conditions uses approximations of the first and second time derivatives of resistance $dR/dt$ and $d^2R/dt^2$. The time varying electrode voltage and weld current are the measured welding parameters used to calculate the dynamic resistance values. As shown in FIG. 4 those values are computed from the measured parameters each half cycle of a 60 Hz power supply. In the case of a DC supply, an equivalent sampling period may be used. The program of FIG. 4 is run every half cycle and a counter, H, is used as an index for each half cycle. If the index exceeds the limit of the blanking period, the resistance and derivatives are calculated. The calculated resistance R(H) is the calculated value at point H, the approximation of the first derivative $dR/dt$ at each point is $dR/dt(H) = R(H) - R(H-1)$ and the approximation of the second derivative is $d^2R/dt^2(H) = dR/dt(H+1) - dR/dt(H)$. Thus the second derivative is calculated retrospectively.

After calculating the derivative values the program looks for an EXPULSION flag. If it is present the program exits the loop since no further analysis is necessary. If it is not present, the program looks for the MIDDLE flag. If it is present the program then looks for an end feature and sets an EXPULSION flag if the end is identified. Otherwise the program exits. If the MIDDLE flag is not present the program looks for a START flag and if it is found it then looks for a middle feature. Then it sets a MIDDLE flag, if appropriate, or exits. If the START flag is not set the program looks for a start feature and if it is found, sets the START flag. Otherwise it looks for a sharp end feature preceded by a middle feature. An EXPULSION flag is set if that feature combination is found.

Figure 5:
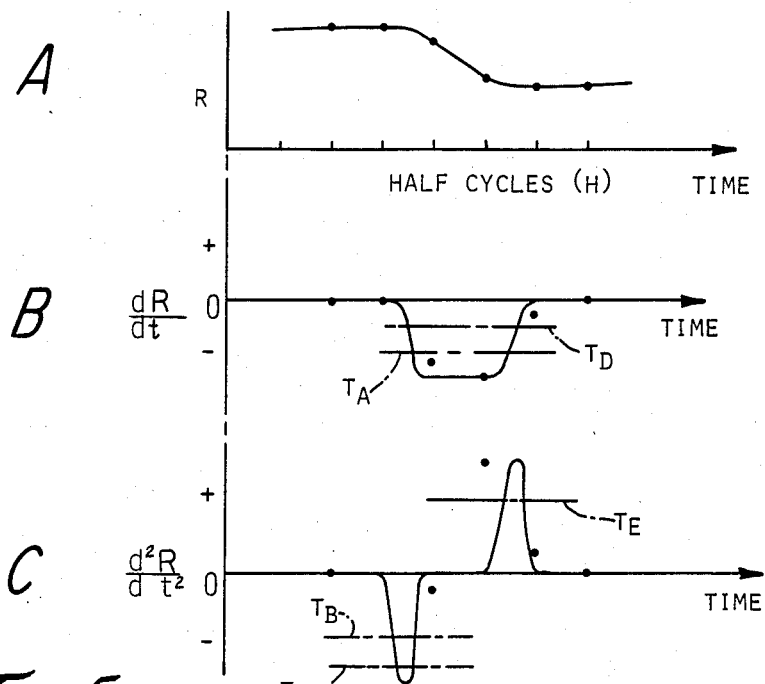
FIG. 5 is a set of resistance and derivative curves showing the analysis of a weld expulsion event.

The resistance and derivative curves shown in FIG. 5 are used to explain the subroutines set forth in FIGS. 6-10. The R-curve, the $dR/dt$ curve and the $d^2R/dt^2$ curve for a simplified expulsion signature contain dots indicating the values calculated at the half cycle sampling points. Since the dot values represent approximate values for the derivatives as defined above, the dots do not always fall exactly on the derivative curve. The $dR/dt$ curve has a negative portion corresponding to the expulsion drop in the R-curve. Two thresholds, $T_A$ and $T_D$, are set to assist in evaluating the rate of resistance drop. The $d^2R/dt^2$ curve has a negative and a positive spike at the start and end of expulsion respectively. The magnitudes of the spikes indicate whether those events are "strong" or "sharp". Thresholds $T_B$ and $T_C$ define levels for weak and strong starts respectively and $T_E$ sets the level for a sharp end. The threshold $T_E$ is also used for identifying a bad geometry condition. Suitable values have been found to be: $T_A = -5 \times 10^{-4}$ ohms/sec, $T_B = -7.2 \times 10^{-2}$ ohms/- sec$^2$, T$_C$=−9.3×10$^{-2}$ ohms/sec$^2$, T$_D$=−3×10$^{-4}$ ohms/sec and T$_E$=5.8×10$^{-2}$ ohms/sec$^2$.

Figure 6:
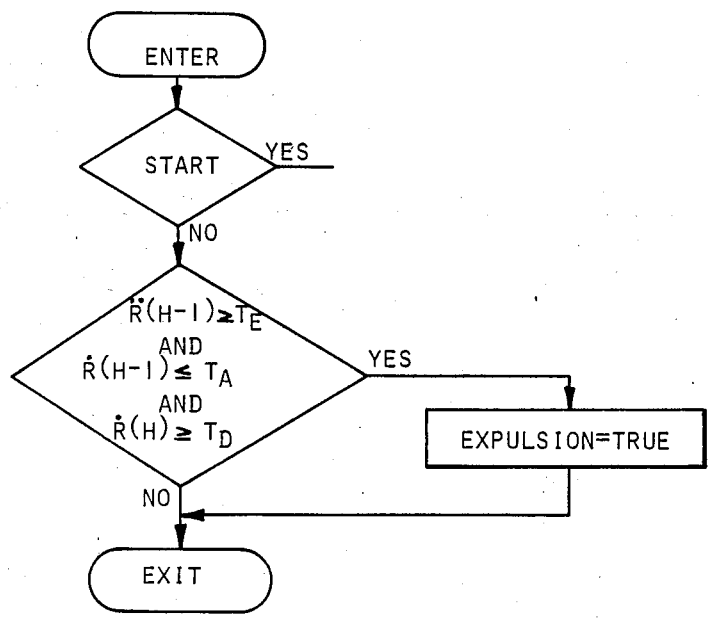
FIGS. 6 through 9 are flow charts of subroutines for the program of FIG. 4.

FIG. 6 shows the flow chart for the subroutine which looks for a sharp end of expulsion preceded by a middle. This condition indicates an expulsion even though the start was too rounded or gradual to be detected. Thus if a start is not detected the program moves to the next decision which determines whether (1) there is a sharp upward curvature in the R-curve, (d$^2$R/dt$^2$(H−1)>=T$_E$) and (2) the slope prior to the curvature is sufficiently negative, (dR/dt(H−1)<=T$_A$) and (3) the slope subsequent to the curvature is sufficiently positive or not too negative, (dR/dt(H)>=T$_D$). If all three conditions are met an EXPULSION flag is set.

Figure 7:
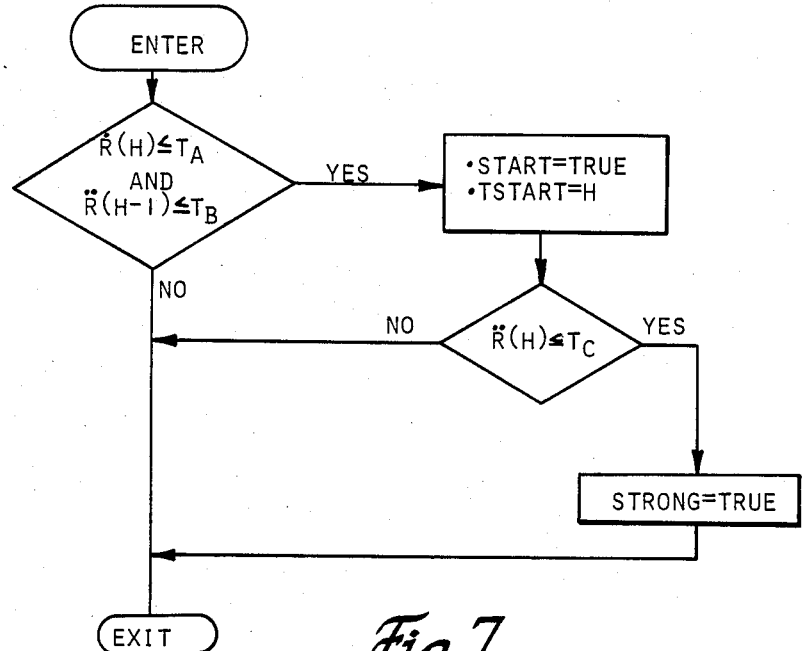

FIG. 7 shows the flow chart for the subroutine which looks for a start feature. The program first addresses the question whether the R-curve is dropping (dR/dt(H)<=T$_A$) and there is a sharp negative curvature (d$^2$R/dt$^2$(H−1)<=T$_B$). If this is true a start of expulsion is hypothesized, a START flag is set and the start time, TSTART, is set to H. Then a test is made to determine whether the start is strong (d$^2$R/dt$^2$(H)<=T$_C$). If it is, a STRONG flag is set. This determines that the start is sufficiently strong that an end feature is not required for an expulsion detection.

Figure 8:
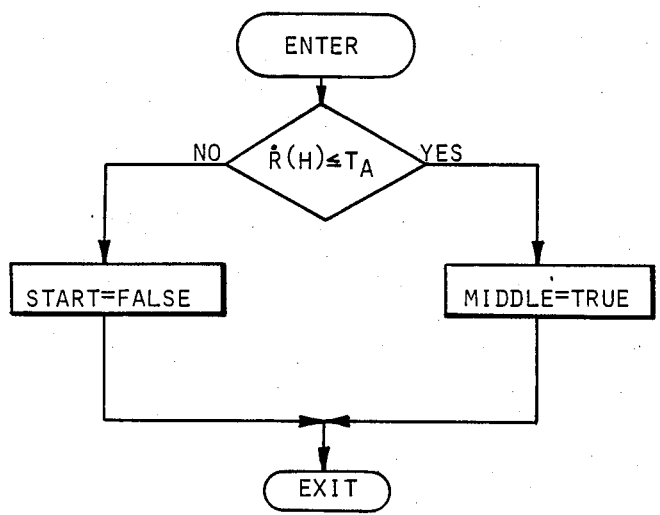

FIG. 8 shows the flow chart for the subroutine which looks for a middle feature. It simply determines if the R-curve continues to drop after the start of expulsion. If it does, the MIDDLE flag is set to hypothesize the detection of the middle of expulsion. If it does not continue to drop, the START flag is reset or turned off to dismiss the hypothesis that expulsion started.

The particular shape of the end feature can confirm that an expulsion has occurred and can reveal the presence of an edge weld or a bad geometry condition resulting from cocked or skidding electrodes. The expulsion shapes shown in the curves of FIG. 10 point out the effect of the different conditions on the tail of the resistance curve. The good geometry condition is characterized by a sharp upward curvature at the end of expulsion resulting in a subsequent fairly level portion, although an upward slope or a slight downward slope are allowable. For the edge weld, the expulsion slope continues for a fixed time (TAIL) after a start (TSTART). If the start feature was strong this indicates that there was an expulsion but an edge weld was made. The bad geometry condition yields an intermediate end curve characterized by a long time curvature less than a set value but also is sufficiently flat to pass the flatness test for good geometry.

Figure 9:
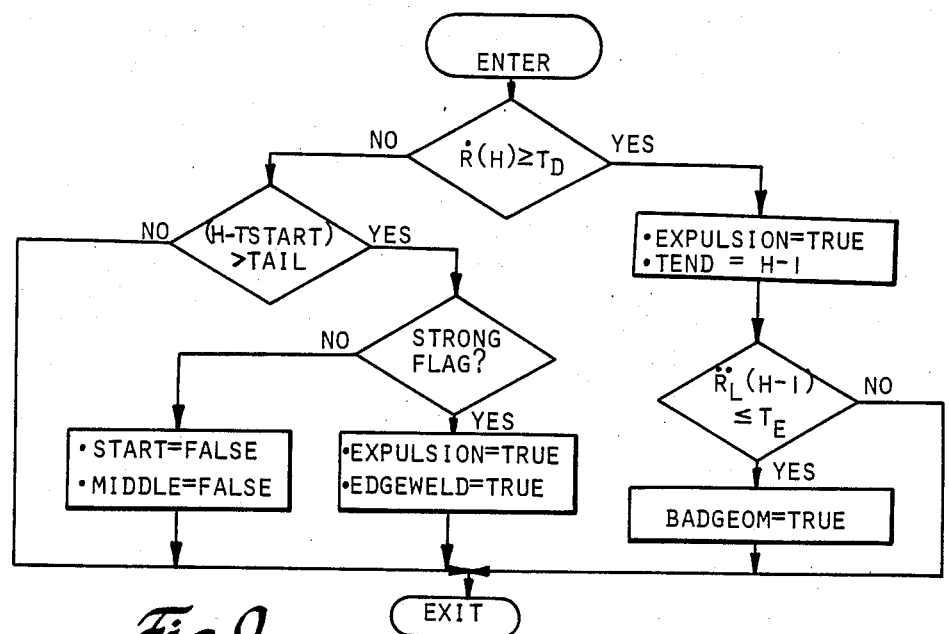
Figure 10:
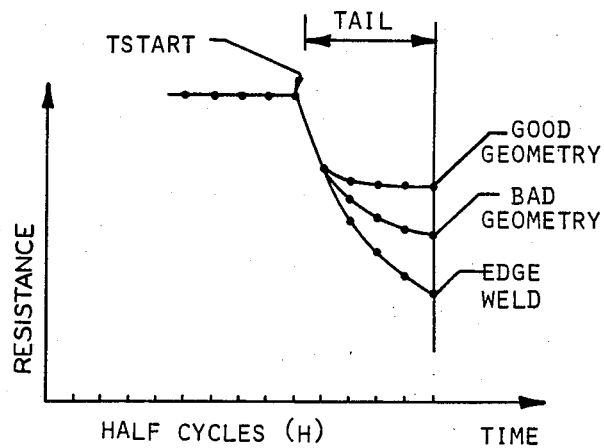
FIG. 10 is a set of resistance curves showing expulsion characteristics for various weld conditions.

FIG. 9 shows the flow chart for the subroutine which looks for the end of expulsion. The first decision is whether the R-curve sufficiently flattens (dR/dt(H)>=T$_D$) after a middle detection to conclude that the end has occurred. If so, the EXPULSION flag is set and the end time, TEND, is set to the value H−1. The next decision is whether the long term curvature of the R-curve in the region of the expulsion is below a set value which is typical of a bad geometry, i.e., cocked or skidding electrodes. Long term curvature is defined as d$^2$R$_L$/dt$^2$(H−1)=dR/dt(H)−[R (H)−R(H−2)]/2 or the difference between the slope at the sampling period H and the average slope over two previous sampling periods. If the long term curvature is less than the threshold T$_E$ a bad geometry flag, BADGEOM, is set.

If the first decision is that the R-curve has not flattened sufficiently to declare an end, the period of the resistance drop (H - TSTART) is compared to a set value (TAIL) to test whether the drop lasted too long. If it has, the program checks for the STRONG flag which indicates a definite start feature and if that is present the EXPULSION and EDGEWELD flags are set and if not the START and MIDDLE flags are reset to dismiss the hypothesis that an expulsion was occurring. An EDGEWELD flag indicates the presence of the long period of resistance drop which is typical in the case of edge welds. The edge weld information is useful to indicate that maintenance may be required to properly position the electrodes on the workpiece.

In summary, the algorithm monitors the weld as it is being made to detect a weak or strong start of expulsion, a middle, and an end or sharp end of expulsion. An expulsion is declared if (1) a start, middle and end are detected in the proper sequence, (2) a sharp end preceded by a middle is detected, or (3) a strong start followed by a middle is detected. In addition an end is analyzed to determine whether an edge weld or bad geometry condition exists. When an EXPULSION flag is set the controller terminates the weld current and sets a few cycles hold time for the weld nugget to congeal.

Figure 11:
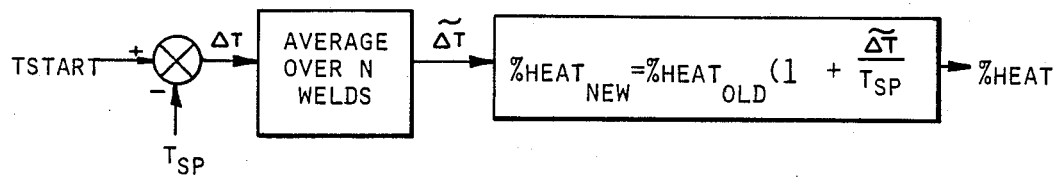
FIG. 11 is a functional diagram of an automatic current stepper according to the invention.

The automatic current stepper part of the controller 26 monitors the electrode condition and modifies the weld heat accordingly. The time of expulsion, TSTART, for each weld is taken as a measure of total weld time and an average over a set of many welds is used to reveal trends of change in weld time which is a result of electrode changes. TSTART for a weld detected only by an end preceded by a middle is taken to be TEND-2. Typically an electrode mushrooms during usage so that current density within the workpiece decreases and longer weld times result. By sensing the time trends appropriate adjustments in weld current can be made accurately and automatically. FIG. 11 is a diagram which shows the calculation procedure for determining the weld heat. A weld time setpoint, T$_{sp}$, is assigned to represent the desired nominal weld time for each weld number or subset of weld numbers identifying the weld position in a sequence of welds. The measured weld time for each weld, TSTART, is compared to the setpoint and the deviation is averaged over a group of, say, 25 to 50 welds. Expulsions which do not occur within the upper and lower termination limits are not included in the average. Alternatively, welds which do not show expulsion within the limits are assigned a late expulsion time, say, 20% deviation from the setpoint. The weld heat is recalculated by adjusting the percent heat by the percentage of the average time deviation. The controller then can, within the current incrementing ability of the current stepper, adjust the weld heat for subsequent welds. Even though the result is usually a gradual increase of weld heat over the life of a set of electrodes, there are conditions where the required heat actually decreases during some portion of the tips' life and the arrangement described above will make the proper reduction in heat level.

It will thus be seen that the method and apparatus of this invention provides a practical way to monitor spot weld completion for control of weld current termination as well as to gather information for current stepper control and for maintenance purposes.

The embodiments of the invention in which an exclusive property or privilege is claimed are defined as follows:

1. A method of monitoring resistance spot welding comprising the steps of;

stabilizing the weld process by preconditioning the workpiece interfaces immediately after electrode contact with the workpiece and before steady state electrode pressure is attained to establish consistent interface resistance levels, measuring electrical welding parameters, calculating first and second derivative resistance values from the measured parameters, and analyzing the calculated values during the welding process to detect an expulsion event and the time of the event.

2. A method of monitoring resistance spot welding comprising the steps of;

stabilizing the weld process by preconditioning the workpiece interfaces immediately after electrode contact with the workpiece and before steady state electrode pressure is attained to establish consistent interface resistance levels, measuring electrical welding parameters, setting a blanking period at the beginning of the weld process when abberations in the parameters frequently occur, after the blanking period, calculating first and second derivative resistance values from the measured parameters, and analyzing the calculated values during the welding process to detect an expulsion event and the time of the event.

3. A method of monitoring resistance spot welding comprising the steps of;

stabilizing the weld process by applying a preheat current pulse to the workpiece immediately after initial contact of electrodes with the workpiece and before steady state electrode pressure is attained and then inhibiting weld current for a cooling period to establish consistent interface resistance levels, measuring electrical welding parameters, calculating first and second derivative resistance values from the measured parameters, and analyzing the calculated values during the welding process to detect an expulsion event and the time of the event.

4. A method of monitoring resistance spot welding comprising the steps of;

measuring electrical welding parameters, calculating dynamic resistance values and first and second derivative resistance curves from the measured parameters, analyzing the calculated values during the welding process to detect an expulsion event and the time of the event by (a) detecting from first and second derivative resistance curves characteristic shapes and values which are indicators of the start of expulsion, the middle of expulsion, and the end of expulsion, and (b) determining an expulsion event upon the occurrence of a middle of expulsion indicator and at least one of the start and the end of expulsion indicators.

5. A method as defined in claim 4 wherein the process is subject to a period of mechanical instability during an early portion of the weld cycle, comprising beginning the step of analyzing the calculated values after the instability period.

6. A method of monitoring resistance spot welding comprising the steps of;

measuring electrical welding parameters, calculating dynamic resistance values and first and second derivative resistance curves from the measured parameters, analyzing the calculated values during the welding process at a time later than the beginning of nugget formation to detect an expulsion event and the time of the event by (a) detecting from the second derivative resistance curve a value below a negative threshold which is an indicator of the start of expulsion, (b) detecting from the first derivative resistance curve a value below another negative threshold which is an indicator of the middle of expulsion, (c) detecting from the second derivative resistance curve a value above a positive threshold which is an indicator of the end of expulsion, and (d) determining an expulsion event upon the occurrence of a middle of expulsion indicator and at least one of the start and the end of expulsion indicators.

7. A method of controlling resistance spot welding comprising the steps of;

applying welding current to a workpiece, measuring electrical welding parameters, calculating first and second derivative resistance values from the measured parameters, analyzing the calculated values during the welding process to detect an expulsion event and the time of the event, and terminating the welding current upon detection of expulsion.

8. A method as defined in claim 7 wherein the welding current is initiated by applying a preheat current pulse immediately after electrode contact to heat the interfaces and then inhibiting current for a cooling period to allow heat dissipation from the interfaces so that the interface resistance is stabilized prior to continuation of the weld current schedule.

9. A method of controlling resistance spot welding comprising the steps of;

applying weld current to a workpiece, stabilizing the weld process by applying a preheat current pulse to the workpiece immediately after initial contact of electrodes with the workpiece and then inhibiting weld current for a cooling period to establish consistent interface resistance levels, measuring electrical welding parameters, calculating first and second derivative resistance values from the measured parameters, analyzing the calculated values during the welding process to detect an expulsion event and the time of the event, and terminating weld current upon detection of an expulsion event.

10. A method of controlling resistance spot welding comprising the steps of;

applying weld current to a workpiece, measuring electrical welding parameters, calculating dynamic resistance values and first and second derivative resistance curves from the measured parameters, analyzing the calculated values during the welding process to detect an expulsion event and the time of the event by (a) detecting from the first and second derivative resistance curves characteristic shapes and values which are indicators of the start of expulsion, the middle of expulsion, and the end of expulsion, and
(b) determining an expulsion event upon the occurrence of a middle of expulsion indicator and at least one of the start and the end of expulsion indicators, and terminating weld current upon determination of an expulsion event.

11. A method of controlling resistance spot welding comprising the steps of;
applying welding current to a workpiece,
measuring electrical welding parameters,
calculating dynamic resistance values and first and second derivative resistance curves from the measured parameters,
analyzing the calculated values during the welding process at a time later than the beginning of nugget formation to detect an expulsion event and the time of the event by
(a) detecting from the second derivative resistance curve a value below a negative threshold which is an indicator of the start of expulsion,
(b) detecting from the first derivative resistance curve a value below another negative threshold which is an indicator of the middle of expulsion,
(c) detecting from the second derivative resistance curve a value above a positive threshold which is an indicator of the end of expulsion, and
(d) determining an expulsion event upon the occurrence of a middle of expulsion indicator and at least one of the start and the end of expulsion indicators, and
terminating weld current upon determining an expulsion event.

12. A method as defined in claim 11 wherein the welding current is initiated by applying a preheat current pulse immediately after electrode contact to heat the interfaces and then providing a cooling period to allow heat dissipation from the interfaces so that the interface resistance is stabilized prior to continuation of the weld current schedule.

13. A method of controlling resistance spot welding comprising the steps of;
applying welding current to a workpiece,
measuring electrical welding parameters,
calculating first and second derivative resistance values from the measured parameters,
analyzing the calculated values during the welding process to detect an expulsion event and the expulsion time,
averaging the expulsion time over a plurality of consecutive welds to obtain a trend of expulsion time, and
changing the heat setting when the average time varies from a setpoint, thereby compensating for changes in electrode geometry.

14. In a resistance welding system having an adjustable heat setting to accommodate changing weld current changes due to electrode wear, the method of controlling resistance spot welding comprising the steps of;
measuring electrical welding parameters,
calculating first and second derivative resistance values from the measured parameters,
analyzing the calculated values during the welding process to detect an expulsion event and the expulsion time,
setting a standard expulsion time,
averaging the deviation of expulsion time from the standard expulsion time over a plurality of consecutive welds to obtain a trend of expulsion time, and
changing the heat setting in accordance with the average expulsion time deviation thereby compensating for changes in electrode geometry.

15. A controller for a resistance spot welding system having electrode means for applying weld current and pressure to a workpiece including;
means for supplying weld current according to a weld schedule, and
control means coupled to the current supply means programmed to:
(a) measure electrical welding parameters,
(b) calculate first and second derivative resistance values from the measured parameters,
(c) analyze the calculated values during the welding process to detect an expulsion event and the time of the event, and
(d) signal the current supply means to terminate the welding current upon detection of expulsion.

16. A controller as defined in claim 15 including means for detecting electrode contact with the workpiece, and means for applying a preheat current pulse immediately after electrode contact to heat the interfaces and then providing a cooling period to allow heat dissipation from the interfaces so that the interface resistance is stabilized prior to continuation of the weld current schedule.

17. A controller for a resistance spot welding system having electrode means for applying weld current and pressure to a workpiece including;
means for supplying weld current according to a weld schedule, and
control means coupled to the current supply means programmed to:
measure electrical welding parameters,
calculate dynamic resistance values and first and second derivative resistance curves from the measured parameters,
analyze the calculated values during the welding process to detect an expulsion event and the time of the event by
(a) detecting from first and second derivative resistance curves characteristic shapes and values which are indicators of the start of expulsion, the middle of expulsion, and the end of expulsion, and
(b) determining an expulsion event upon the occurrence of a middle of expulsion indicator and at least one of the start and the end of expulsion indicators, and
signal the current supply means to terminate weld current upon determination of an expulsion event.

18. A controller for a resistance spot welding system having electrode means for applying weld current and pressure to a workpiece including;
means for supplying weld current according to a weld schedule, and
control means coupled to the current supply means programmed to:
measure electrical welding parameters,
calculate dynamic resistance values and first and second derivative resistance curves from the measured parameters,
analyze the calculated values during the welding process at a time later than the beginning of nugget formation to detect an expulsion event and the time of the event by (a) detecting from the second derivative resistance curve a value below a negative threshold which is an indicator of the start of expulsion, (b) detecting from the first derivative resistance curve a value below another negative threshold which is an indicator of the middle of expulsion, (c) detecting from the second derivative resistance curve a value above a positive threshold which is an indicator of the end of expulsion, and (d) determining an expulsion event upon the occurrence of a middle of expulsion indicator and at least one of the start and the end of expulsion indicators, and generate a signal to terminate weld current upon determining an expulsion event.

* * * * *